INVENTOR.
WILLIAM C. GARRETT.
BY
Willard S. Grover
ATTORNEY.

INVENTOR.
WILLIAM C. GARRETT.
BY
ATTORNEY.

INVENTOR.
WILLIAM C. GARRETT.
BY
ATTORNEY.

United States Patent Office 3,384,269
Patented May 21, 1968

---

3,384,269
ARTICLE COUNTING MACHINE WITH AUTOMATIC CONTROL OF DISCHARGE ASSISTANT
William C. Garrett, 5223 N. 28th Drive,
Phoenix, Ariz. 85017
Filed May 22, 1967, Ser. No. 640,270
6 Claims. (Cl. 221—201)

ABSTRACT OF THE DISCLOSURE

A machine for automatically counting and delivering counted groups of elongated cylindrical pieces to a discharge station for removal by hand for packaging.

Cross-References to Related Applications

There are no cross-references to related applications.

Background of the invention (1) The field of this invention lies in machines for receiving, counting and delivering counted batches of parts to a delivery station for removal by hand.

(2) Heretofore, wasteful and time consuming effort was required to manually select and count items such as elongated sticks when packaging the items. Often an excess number were deliberately placed in the shipping containers because it was quicker and easier to do than trying to manually count and arrange the items before packaging. This resulted in high costs from excessive use of the items above that actually needed with each shipment.

Summary of the invention

In this invention the object is to provide a machine for receiving a batch of pieces and to automatically arrange, count and present groups of counted pieces at a delivery station for manual pickup and handling.

Still another object is to present groups of accurately counted pieces for manual pickup and handling together with means to automatically intermittently present such counted groups at the will of the operator.

And a further object is to provide a machine for counting and presenting counted groups of parts which may be readily adjusted to present groups of different counted amounts to a manual pickup station.

And a still further object is to provide such a machine which automatically agitates and aligns and accurately counts the pieces delivered the manual pickup station or receptacle.

Description of the preferred embodiment

Figure 1:
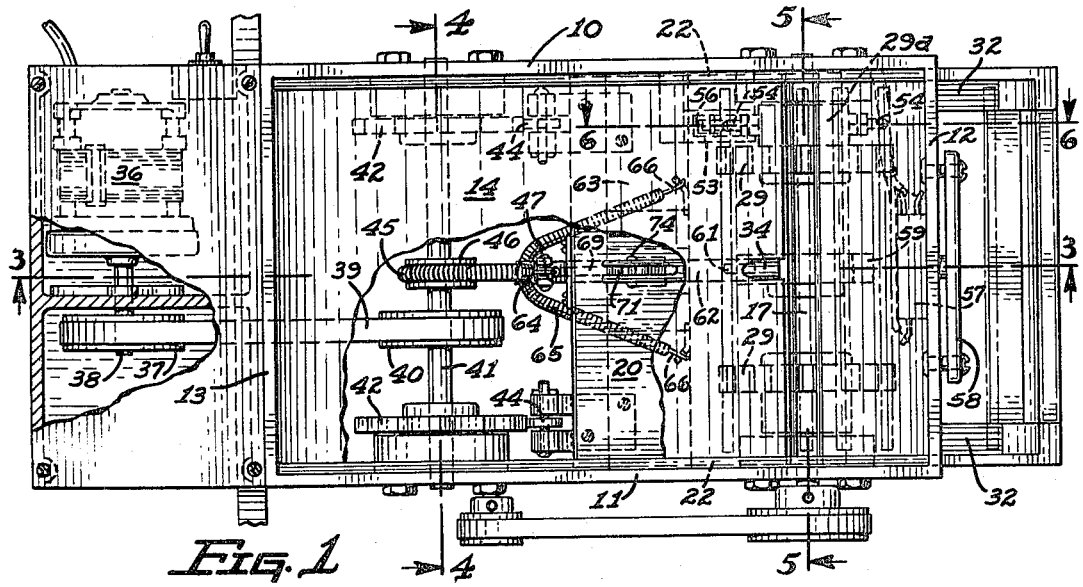
FIG. 1 is a plan view of a counting machine incorporating the features of this invention.
Figure 2:
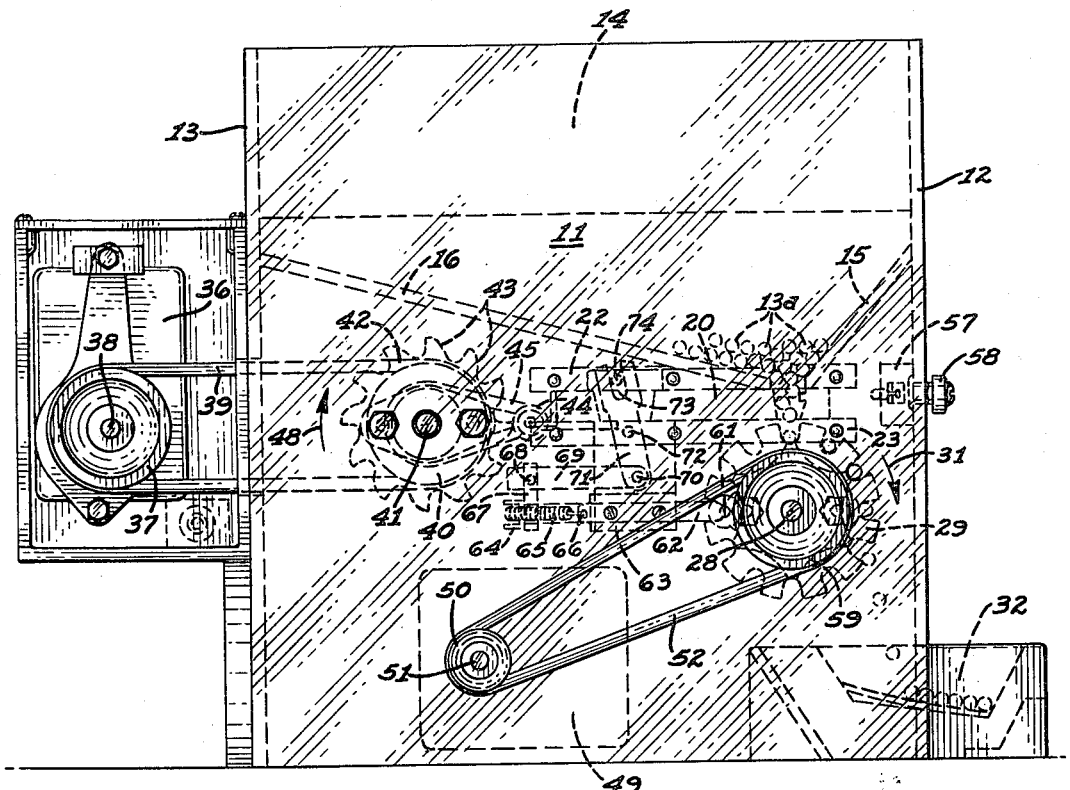
FIG. 2 is a side elevation of the machine shown in FIG. 1.
Figure 3:
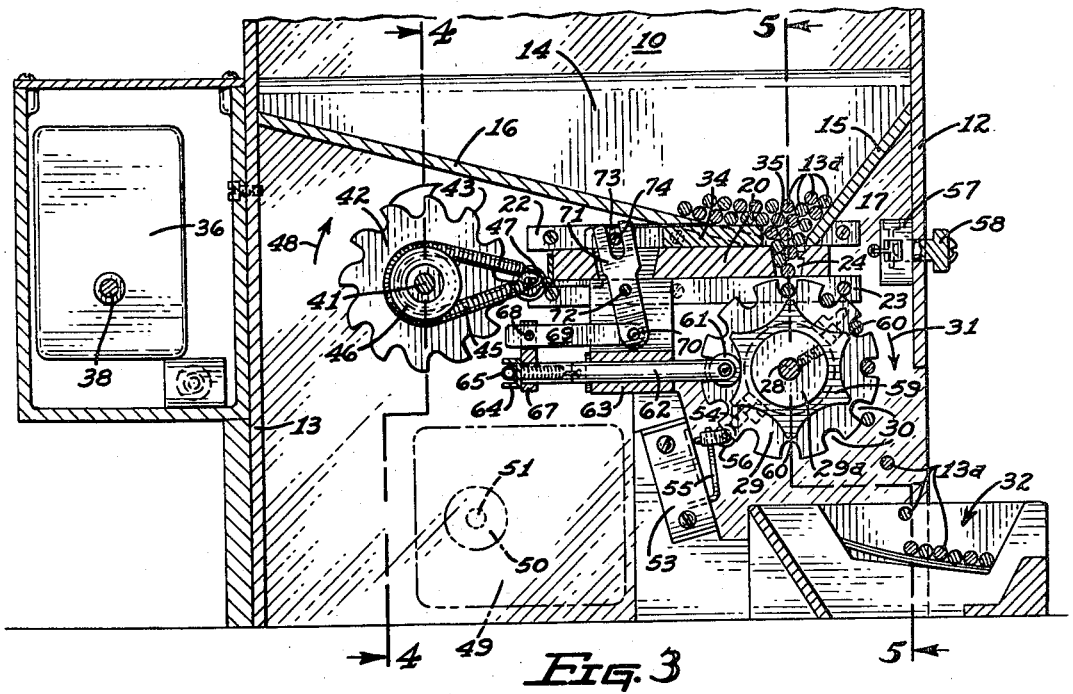
FIG. 3 is a sectional view on the line 3—3 of FIG. 1.
Figures 4, 5:
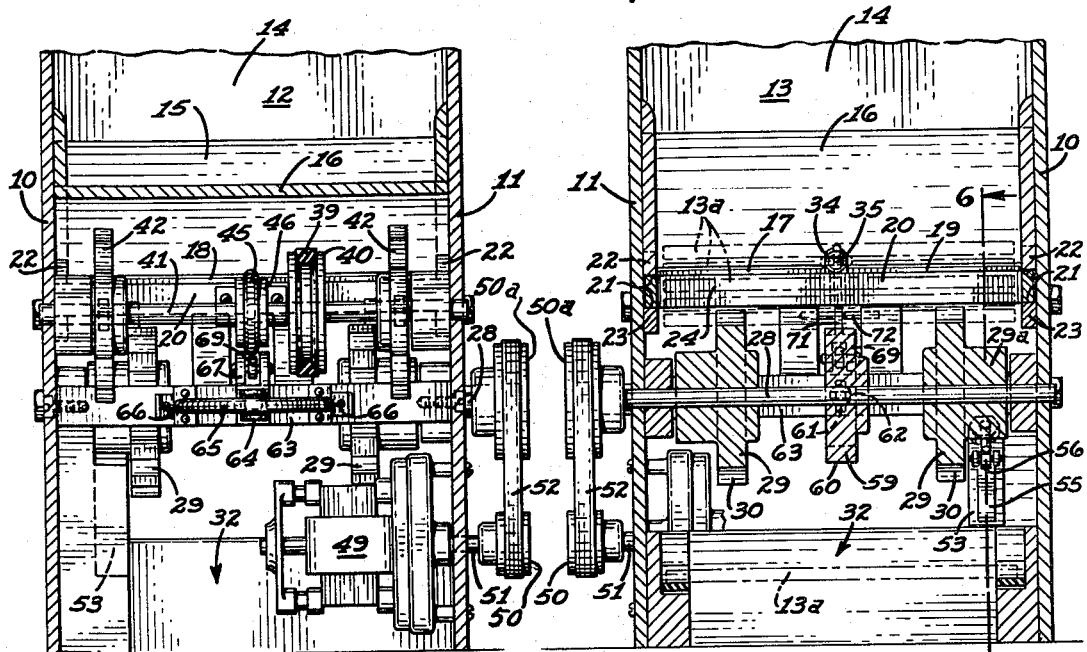
FIG. 4 is a sectional view on the line 4—4 of FIG. 1.
FIG. 5 is a sectional view on the line 5—5 of FIG. 1.

As an example of one embodiment of this invention, there is shown a machine having a frame comprising the side panels 10 and 11 and the front and rear panels 12 and 13 suitably integrally connected together. A supply hopper 14 for the parts 13a to be counted is formed in the upper portion of the frame by the steep sloping front baffle 15 and the rear lesser sloping baffle 16 integrally formed with the sides 10 and 11 and the front and rear panels 12 and 13. A discharge opening 17 is formed in the bottom of the hopper 14 between the lower edges 18 and 19 of the baffles 15 and 16.

Figure 6:
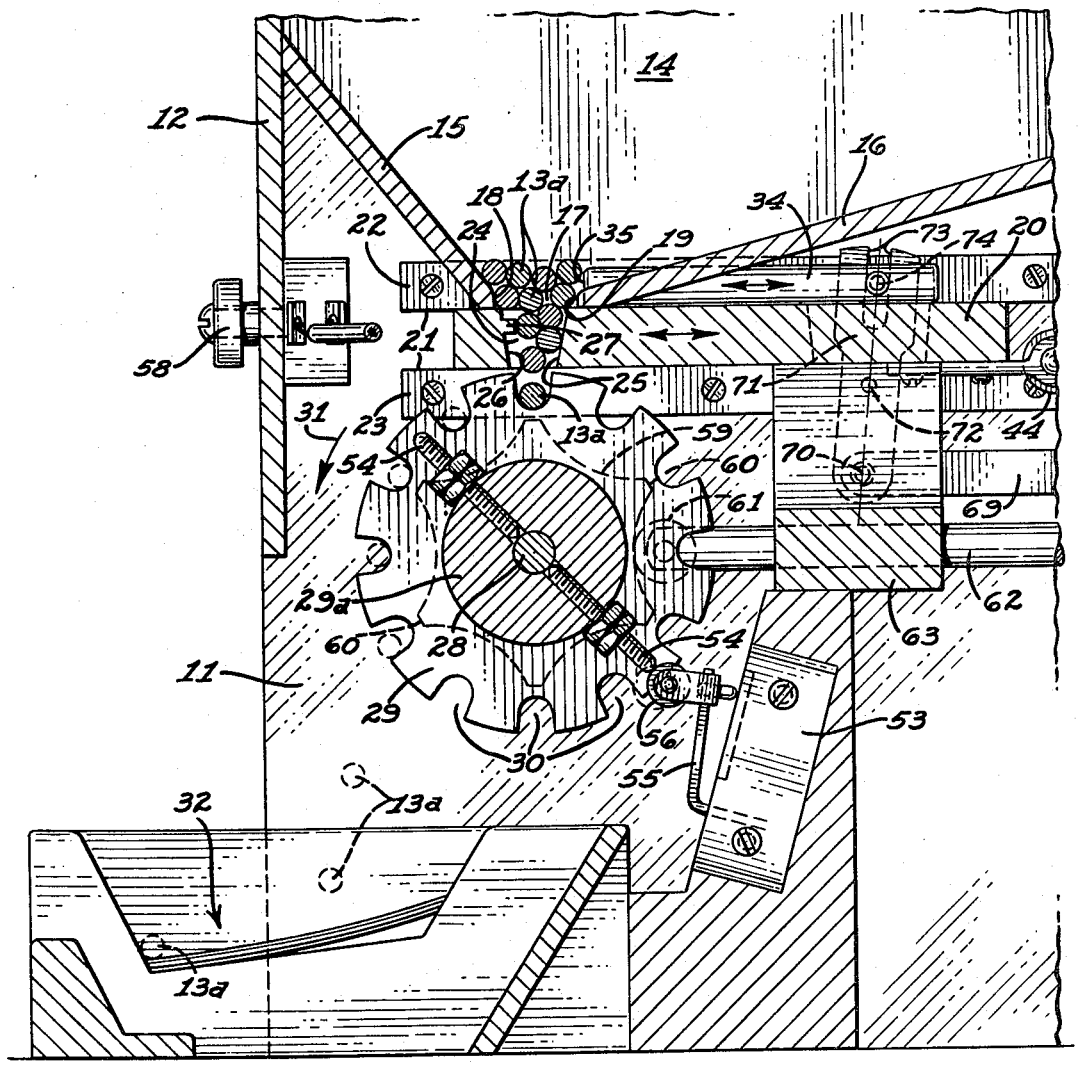
FIG. 6 is a greatly enlarged fragmentary sectional view on the line 6—6 of FIG. 1.

Immediately below the hopper discharge opening 17 is the vibrator feeder plate 20 arranged to reciprocate in suitable guideways 21 formed by the guide rails 22 and 23 fixed to the side panels 10 and 11. A slot 24 is formed in the vibrator feeder plate having a rear sloping surface 25 and a front sloping surface 26 converging toward the bottom of the slot 24. A ledge 27 is formed on the sloping surface 26 so as to engage the parts 13a to force them into staggered positions of free fall in the slot 24, as best seen in FIG. 6, as the vibrator feed plate is reciprocating.

Below the slot 24 of the vibrator feeder plate 20 fixed on a shaft 28 suitably journaled in the side panels 10 and 11 is the counting wheels 29 having a series of circumferentially spaced aligned part receiving slots 30 formed in their peripheries, each slot 30 being arranged to receive a single part 13a as it passes under the slot 24 with the wheels rotating in the direction indicated by the arrow 31. Rotation of the wheels 29 dropping prescribed numbers of parts 13a into a suitable discharge and manual pickup tray 32.

A reciprocating alignment plunger 34 has a part engaging end 35 reciprocating horizontally transversely of the slot 17 to maintain parallelism of the parts 13a entering the slot 17 as the parts feed down the sloping baffles 15 and 16 of the hopper 14.

Suitably fixed to the rear panel is the vibrator drive motor 36 having a drive pulley 37 fixed on its motor shaft 38 over which operates the belt 39 which in turn operates over a pulley 40 fixed on the vibrator shaft 41 suitably journaled in the side panels 10 and 11. Fixed at each end of the shaft are the notched vibrator wheels 42 having cam surfaces 43 arranged to intermittently engage the cam rollers 44 suitably journaled on the rear portion of the vibrator feeder plate 20. A tension spring 45 is wrapped about an idler pulley 46 journaled on the vibrator shaft 41 and has its ends 47 hooked to the rear of the vibrator feeder plate so as to yieldingly normally hold the rollers 44 in operative contact with the peripheral cam surfaces 43 of the vibrator wheels 42 as they are rotated in the direction indicated by the arrow 48 to cause rapid vibrating reciprocation of the vibrator feeder plate.

The counting wheel 29 and alignment plunger 34 are actuated from a slow speed gear reduction motor 49 suitably mounted on the side panel 11 having a pulley 50 on the motor shaft 51 over which operates the belt 52 which in turn operates over a pulley 50a fixed to the counting wheel shaft 28 so that whenever the motor 49 is energized the counting wheels 29 will be rotated in the direction of the arrow 31, and when the motor 49 is deenergized the wheels 29 will stop. A normally closed limit switch 53 suitably mounted on the frame of the machine is connected in series with the motor 49 and a source of electrical power which is actuated by one or more trip pins 54 which are demountably carried on a hub 29a of one of the counting wheels 29 so that whenever a trip pin 54 actuates the control arm 55 by engaging its roller 56, switch 53 is opened to deenergize the motor 49 to stop rotation of the wheels 29. A momentary contact push button switch 57 mounted on the front panel 12 has a manual trip bar 58 which when momentarily pressed short-circuits the limit switch 53 to again energize motor 49 to resume rotation of the counting wheels 29 until another trip pin 54 actuates limit switch 53, stopping counting wheel rotation.

The alignment plunger 34 is reciprocated from a multilobe cam disc 59 fixed to the shaft 28 having a series of cam projections 60 which engage the cam roller 61 on the cam roller plunger 62 suitable slidably mounted in a bracket 63 fixed to the frame of the machine. The rear end of the plunger 62 has a bifurcated end 64 over which is stretched the tension spring 65 with its ends 66 fixed to the bracket so as to normally yieldingly urge the plunger 62 and its roller into operative contact with the cam disc 59. To the rear end of the plunger 62 is fixed an arm 67 pivotally connected by a pin 68 to a link 69 which in turn is pivotally connected by a pin 70 to the outer end of a rocking lever 71 pivotally mounted on a pin 72 carried in the bracket 63. The upper end of the rocking lever 71 has an elongated longitudinally extending slot 73 which operatively receives a pin 74 fixed to alignment plunger 34 so as to reciprocate the alignment plunger 34 whenever the motor 49 is energized as described above. Thus, with the vibrator motor 36 continuously operating, the trip bar 58 is momentarily pushed, the counting wheels and plunger 34 operate until the limit switch 53 is again opened so as to present a given number of counting slots 30 under the vibrator slot 24 and to drop the required number of parts 13a into the tray 32. The number of parts deposited with each actuation of the push button 58 can be varied by the number of trip pins 54 provided in hub 55 to actuate the limit switch 53.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

I claim:

1. A counting machine comprising in combination:
   (A) a frame,
   (B) a hopper in the top portion of said frame to receive the parts to be counted and having a discharge opening in the bottom thereof,
   (C) a vibrator feeder plate movably mounted on said frame having a slot to receive parts from said discharge opening of said hopper,
   (D) a counting wheel journaled on said frame having slots circumferentially disposed about the periphery thereof arranged to selectively receive a part in each slot from said slot in said vibrator feeder plate,
   (E) a discharge and pickup tray arranged to receive counted discharged parts from said counting wheel,
   (F) power means for continuously actuating said vibrator feeder plate,
   (G) and manually intermittently actuable power means for rotating said counting wheel.

2. In a machine as set forth in claim 1 wherein there is provided a reciprocatable alignment plunger in the bottom of said hopper actuable from the power means for rotating said counting wheel.

3. In a machine as set forth in claim 1 wherein said slot in said vibrator feeder plate is characterized by downwardly converging sloping sides including a horizontally projecting ledge extending from one of said sloping sides.

4. In a machine as set forth in claim 1 wherein said counting wheel includes one or more trip pins arranged to engage a limit switch on said frame to deenergize said power means for rotating said counting wheel so as to determine the number of parts dispensed by said counting wheel to said discharge and pickup tray.

5. In a machine as set forth in claim 1 wherein said power means for rotating said counting wheel is energized by a manually actuable momentary contact push button and the power means deenergized by the positional rotation of said counting wheel.

6. In a machine as set forth in claim 1 wherein said hopper includes sloping baffles from one of which an alignment plunger intermittently projects horizontally to align the parts with the discharge slot of said hopper.

References Cited

UNITED STATES PATENTS

| | | | |
|---|---|---|---|
| Re. 13,731 | 5/1914 | Gauper | 221—204 |
| 869,635 | 10/1907 | Jacobs | 221—266 X |
| 1,099,705 | 6/1914 | Kolb | 221—201 X |
| 1,393,642 | 10/1921 | Rose | 221—266 X |
| 1,485,099 | 2/1924 | Wahl | 221—7 X |
| 1,497,576 | 6/1924 | Molins | 221—266 X |
| 1,976,351 | 10/1934 | Matthiesen | 221—204 |
| 2,234,316 | 3/1941 | Payne | 221—204 |
| 2,509,069 | 5/1950 | Mrachek | 221—266 X |
| 3,045,910 | 7/1962 | McLearn | 221—7 |
| 3,206,062 | 9/1965 | Rappaport | 221—7 |

SAMUEL F. COLEMAN, *Primary Examiner.*